(No Model.)
F. DE LA MATYR.
GUARD FOR VEHICLE SHAFTS.
No. 482,726. Patented Sept. 20, 1892.
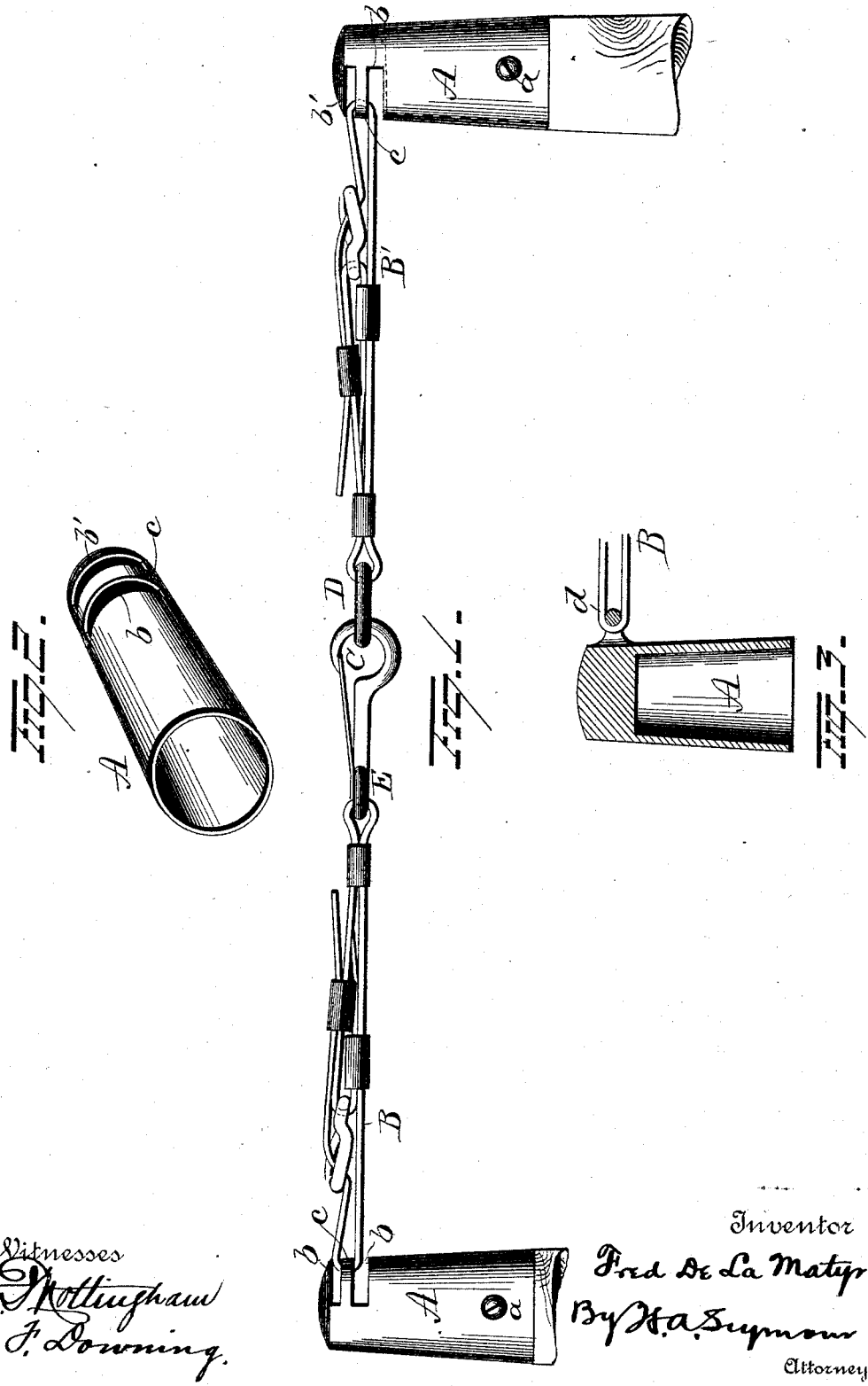
Witnesses
C. J. Nottingham
G. F. Downing
Inventor
Fred De La Matyr
By H. A. Seymour
Attorney

UNITED STATES PATENT OFFICE.

FRED DE LA MATYR, OF FREMONT, NEBRASKA.

GUARD FOR VEHICLE-SHAFTS.

SPECIFICATION forming part of Letters Patent No. 482,726, dated September 20, 1892.

Application filed November 27, 1891. Serial No. 413,241. (No model.)

*To all whom it may concern:*

Be it known that I, FRED DE LA MATYR, of Fremont, in the county of Dodge and State of Nebraska, have invented certain new and useful Improvements in Guards for Vehicle-Shafts; and I do hereby declare the following to be a full, clear, and exact description of the invention, such as will enable others skilled in the art to which it appertains to make and use the same.

My invention relates to an improvement in guards for vehicle-shafts, the object being to prevent the reins of a horse from slipping under the ends of the shafts of a vehicle or otherwise interfering with the proper action of the driving-gear.

A further object is to produce a guard for vehicle-shafts which can be fastened or unfastened quickly and conveniently and which can be easily and quickly applied to the shafts of any vehicle.

With these objects in view the invention consists in certain novel features of construction and combinations and arrangements of parts, as hereinafter set forth, and pointed out in the claim.

In the accompanying drawings, Figure 1 is a view of my device attached to a pair of vehicle-shafts. Fig. 2 is a view of my improved tip. Fig. 3 is a view of a modification.

A A represent ferrules or tips adapted to fit on the ends of a pair of vehicle-shafts, to which they are secured by a screw $a$, preferably a wood-screw. The ferrules or tips A may be made of any desired material, and may be polished or otherwise elaborated, if preferred. Near the ends of the ferrules or tips A are slots $b$ $b'$ of sufficient size to admit of a strap which is passed through them, as presently explained. These slots $b$ $b'$ are cut in the ferrules or tips A and are approximately parallel, thereby forming a loop $c$. A strap B passes through a slot $b$ under the loop $c$, and out again through the slot $b'$, through a loop or eye E in a snap-hook C, and then being doubled upon itself the ends are fastened together by means of a buckle F. The strap B' is arranged in practically the same manner, the only difference being that instead of passing through a snap-hook it passes through a ring D. This ring D is adapted to be engaged by the snap-hook C to unite the straps B B', so as to enable the horse to be led in or out of the shafts, as occasion requires.

Instead of making slots $b$ $b'$ in the ferrules or tips A A, said ferrules or tips may be provided with perforated or slotted ears $d$, as shown in Fig. 3.

Having fully described my invention, what I claim as new, and desire to secure by Letters Patent, is—

As an article of manufacture, a shaft-guard, comprising tips or thimbles, adapted to be secured to the ends of the shafts, said tips or thimbles provided each with a pair of parallel slots $b$ $b'$ on their sides, whereby a loop $c$ is formed, a strap buckled in each loop, and a snap-hook connected with one strap and a ring with the other, said straps made just long enough to reach from one shaft to the other when coupled together, whereby they are held taut, substantially as set forth.

In testimony whereof I have signed this specification in the presence of two subscribing witnesses.

FRED DE LA MATYR.

Witnesses:
FRANK DOLEZAL,
ROBERT J. STINSON.